United States Patent
Mostafa

(10) Patent No.: US 8,150,989 B2
(45) Date of Patent: Apr. 3, 2012

(54) MULTIMEDIA MESSAGING METHOD AND SYSTEM

(75) Inventor: Miraj Mostafa, Tampere (FI)

(73) Assignee: Core Wireless Licensing S.A.R.L., Luxembourg (LU)

(*) Notice: Subject to any disclaimer, the term of this patent is extended or adjusted under 35 U.S.C. 154(b) by 1457 days.

(21) Appl. No.: 10/149,639

(22) PCT Filed: Feb. 8, 2002

(86) PCT No.: PCT/IB02/01431
§ 371 (c)(1),
(2), (4) Date: Feb. 3, 2003

(87) PCT Pub. No.: WO02/063849
PCT Pub. Date: Aug. 15, 2002

(65) Prior Publication Data
US 2003/0154300 A1 Aug. 14, 2003

(51) Int. Cl.
*G06F 15/16* (2006.01)
(52) U.S. Cl. ........................ 709/231; 709/217
(58) Field of Classification Search .................. 709/203, 709/207, 217–219, 231
See application file for complete search history.

(56) References Cited

U.S. PATENT DOCUMENTS

| | | | |
|---|---|---|---|
| 5,642,171 A | | 6/1997 | Baumgartner et al. |
| 5,745,782 A | | 4/1998 | Conway |
| 6,094,661 A | | 7/2000 | Salomäki |
| 6,233,318 B1 | * | 5/2001 | Picard et al. ............... 379/88.17 |
| 6,317,795 B1 | * | 11/2001 | Malkin et al. ............... 709/246 |
| 6,526,580 B2 | * | 2/2003 | Shimomura et al. ........... 725/63 |
| 6,549,612 B2 | * | 4/2003 | Gifford et al. .............. 379/67.1 |
| 6,784,899 B1 | * | 8/2004 | Barrus et al. ............... 715/717 |
| 6,917,965 B2 | * | 7/2005 | Gupta et al. ................. 709/206 |
| 6,976,082 B1 | * | 12/2005 | Ostermann et al. .......... 709/231 |
| 7,284,187 B1 | | 10/2007 | Corboy |

FOREIGN PATENT DOCUMENTS

| | | |
|---|---|---|
| EP | 0 662 763 A2 | 7/1995 |
| EP | 0 845 894 A3 | 9/1999 |
| EP | 0 984 584 A1 | 3/2000 |
| JP | 08-097854 | 4/1996 |
| JP | 10-040188 | 2/1998 |
| JP | 10-240643 | 9/1998 |
| JP | 10-313338 | 11/1998 |
| JP | 11-328063 | 11/1999 |
| JP | 2000-222302 | 8/2000 |

(Continued)

OTHER PUBLICATIONS

3rd Generation Partnership Project, Technical Specification Group Terminals; Multimedia Messaging Service (MMS); Functional Description; Stage 2 (Release 4) 3GPP TS 23.140 V4.1.0 (Dec. 2000).

(Continued)

*Primary Examiner* — Faruk Hamza
(74) *Attorney, Agent, or Firm* — AlbertDhand LLP

(57) ABSTRACT

A multimedia messaging method and system, wherein the same multimedia message can be used to encapsulate both non-streamable media components and descriptors relating to streamable media components. A recipient extracts the descriptors from the multimedia message and initiates streaming sessions accordingly. The notification process by which a recipient user agent is informed of the availability of a multimedia message is the same regardless the type of the components within the message.

27 Claims, 6 Drawing Sheets

FOREIGN PATENT DOCUMENTS

| | | |
|---|---|---|
| JP | 2000-232530 | 8/2000 |
| JP | 2001-005751 | 1/2001 |
| WO | WO 94/11858 | 5/1994 |
| WO | WO 94/11981 | 5/1994 |
| WO | WO 02/11398 A1 | 2/2002 |

OTHER PUBLICATIONS

3$^{rd}$ Generation Partnership Project, Technical Specification Group Services and System Aspects; Packet-switched Streaming Services (PSS); General Description (Release 4) 3GPP TS 26.233 V1.0.0 (Dec. 2000).

3$^{rd}$ Generation Partnership Project, Technical Specification Group Services and System Aspects; Packet-switched Streaming Services (PSS); Protocols and Codecs (Release 4) 3GPP TS 26.234 V1.0.0 (Dec. 2000).

WAP-209, MMSEncapsulation—WAP MMS Message Encapsulation—Proposed Version 17—Feb. 2000—*Wireless Application Protocol forum Ltd. 2000.*

"Multimedia Messaging Service For GPRS and UMTS" by Jarkko Sevanto, appearing in: Wireless Communications and Networking Conference 1999. WCN. IEEE; New Orleans, LA, USA, Sep. 21-24, 1999, vol. 3, pp. 1422-1426, ISBN: 0-7803-5668-3.

"On-demand mobile media—A rich service experience for mobile users", by Erik Ekuuden et al, Ericsson Review, 2001, No. 4, pp. 168-177, ISSN: 0014-0171.

"Circuit-Switched Mobile Multimedia Telephony—Terminal Requirements and Call Control", by Miraj E. Mostafa, appearing in Third International Symposium on Wireless Personal Multimedia Communications, WPMC'00. Proceedings, Bangkok, Thailand, Nov. 12-15, 2000, vol. 2, pp. 994-999.

Okumura et al., The Method of the QoS control on a MPEG-4 over RTP delivery system. Multimedia, Distributed, Cooperative and Mobile (DICOMO 2000) Symposium, vol. 2000, No. 7, Information Processing Society of Japan, p. 443-438, Jun. 28, 2000.

Meggers and Park, A Multimedia communication architecture for handheld devices. The ninth IEEE International Symposium, vol. 3, p. 1245-1249, Sep. 8-11, 1998.

* cited by examiner

MULTIMEDIA MESSAGING METHOD AND SYSTEM

This invention relates to data transmission. More specifically, the invention relates to the streaming of media content in a Multimedia Messaging Service.

In mobile communications networks, the term Multimedia Messaging Service (MMS) is commonly used to describe a new approach for transmitting messages having multimedia content. The Multimedia Messaging Service allows messaging between different mobile users and/or between mobile users and the Internet. There is an already agreed solution for providing an MMS in $3^{rd}$ Generation mobile communication networks and its features are described in $3^{rd}$ Generation Partnership Project (3GPP) Technical Specification (TS) 23.140, V.4.1.0 "Multimedia Messaging Service (MMS), Functional Description, Stage 2 (Release 4, 2000-12)". The Multimedia Messaging Service proposed in 3GPP TS 23.140, release 4 employs a store-and-forward approach to message delivery. Multimedia messages are constructed in such a way that the media content, information necessary to describe the media content and addressing information, identifying the intended receiver of the message, are encapsulated together. The multimedia message is then sent from a sending MMS user agent to a Multimedia Messaging Service Centre MMSC, which in turn notifies the intended receiver (recipient MMS user agent) about the message. Later on, the multimedia message is downloaded by the recipient MMS user agent terminal as a whole and only presented to the user once downloaded and stored in the recipient MMS user agent.

Next, the structure and operation of a typical MMS system will be described with reference to FIGS. 1, 2 and 3.

FIG. 1 shows an overview of MMS system elements according to 3GPP TS 23.140. The system comprises the following items:
- a plurality of MMS user agents (UAs) 110, each of which is capable of transmitting and receiving multimedia messages;
- a roaming MMS user agent 127;
- Access networks 122, 124 and 126 of different types including:
  - A second generation mobile telecommunications network 122 such as a GSM phase 2 network;
  - A third generation mobile telecommunications network 124 such as a Universal Mobile Telecommunications System (UMTS); and
  - A mobile access network 126, for example a wireless-LAN network.
- The Internet (or another Internet Protocol (IP)-network) 130, having an external server 134, such as an e-mail server, and a wired E-mail client 132;
- A Multimedia Messaging Service relay 142 and an MMS server 144 which, in this example, are integrated into a single unit, referred to as a Multimedia Messaging Service Centre (MMSC) 140, but which can alternatively be implemented as separate or distributed entities;
- A message store 150 in connection with the MMS server 144; and
- User databases 160 comprising, for example, user subscription and addressing information.

The collective term Multimedia Messaging Service Environment (MMSE) is used to describe those functional elements that operate together to implement a multimedia messaging service. In FIG. 1, an MMSE is formed by the elements within the oval outlined region.

Referring in further detail to FIG. 1, each MMS user agent 110 connects to the MMS relay 142 through its access network 122, 124. The roaming MMS user agent 127 connects to the MMS relay 142 through the mobile access network 126 and via the Internet 130. The MMS relay is connected to the MMS server 144 and to the user databases 160. Furthermore, the external server 134 and the wired E-mail client 132 are connected to the Internet 130.

FIG. 2 shows an overview of interworking between different MMSE's according to 3GPP TS 23.140. The communication of multimedia messages takes place between user agents 110A (sender) and 110B (recipient) which reside in two different Multimedia Messaging Service Environments. For simplicity and clarity, the two Multimedia Messaging Service Environments, MMSE A and MMSE B, are each shown to comprise a single MMS relay, linked to a single MMS server, thus forming two MMSC's 214 and 224. It should be appreciated that in a practical MMSE, the number of MMS relays and servers may be, and typically will be, greater than this. MMSE A and MMSE B may, for example, have different operators, different geographical locations or coverage areas and/or differ in terms of their technical characteristics and capabilities. Furthermore, in the situation where a particular MMSE comprises more than one MMS relay, the method according to the invention can also be applied within the MMSE.

In the example shown in FIG. 2, both MMS user agents 110A and 110B are depicted as devices that communicate with their respective MMSE 210, 220 via a radio communication network 212, 222. However, it should be appreciated that either MMSE user agent A or MMSE user agent B, or both of them, could reside in a fixed line network (not shown).

In connection with FIG. 2, it will be assumed that MMS user agent A 110A, which has subscribed to the multimedia messaging service provided in Multimedia Messaging Service Environment A 210, wishes to send some media content to MMS user agent B 110B, which has a subscription to the multimedia messaging service provided in MMSE B 220. In general, the content of a multimedia message can comprise a variety of components, some of which are suitable for streaming and other components which are not typically suitable for streaming, such as text or still images. In the following example, which describes the creation, transmission and retrieval of a multimedia message, it will be assumed that all the components of the message are non-streamable content types. The current provisions for streaming download of multimedia message components provided by 3GPP TS 23.140 will then be considered separately.

Referring once more to FIG. 2, when initiating the communication of a multimedia message to MMS user agent B, MMS user agent A first selects the media content to be transmitted. For example, the media content may take the form of a still image and some associated text, stored in the memory of user agent A. The image may have been recorded, for example, using a camera, and still image encoding equipment built into user agent A. Alternatively, the image and text may already have been downloaded from another source to user agent A. In either case, user agent A encapsulates the media content as a multimedia message, comprising the media content itself, information necessary to describe the media content and addressing information, identifying the intended recipient of the message. MMS user agent A then sends the message to MMS relay A through radio network A 212.

On receiving the multimedia message, MMS relay A determines, from the addressing information included with the message, that the intended recipient is not a user agent of MMSE A, but a user agent of MMS relay B and forwards the multimedia message to MMS relay B. Routing of the multimedia message to the correct MMS relay, i.e. that responsible for MMS user agent B is achieved, for example, using standardised mechanisms provided for in the existing 3GPP multimedia messaging solution. On receiving the multimedia message, MMS relay B stores the media content in MMS server B and sends a notification to the intended recipient, MMS user agent B, thereby indicating that a multimedia message has arrived and its content is available to be downloaded from MMS relay B. In response to receiving the notification, MMS user Agent B retrieves the media content from (via) the MMS relay B. The retrieval of the media content is initiated by signalling with MMS relay B.

FIG. 3 illustrates the process of notification and multimedia message retrieval in more detail. Specifically, FIG. 3 shows the flow of messages that takes place when MMS relay B receives an MMS message intended for recipient MMS user agent B. MMS relay B receives the MMS message, stores it in MMS server B, and then informs MMS user agent B of the arrival of the message using an MMS notification message 310 (MM1_notifcation.REQ in 3GPP TS 23.140).

Next, the MMS user agent B responds with an MMS notification response 320 (MM1_notifcation.RES in 3GPP TS 23.140) to acknowledge receipt of the MMS notification 310.

Having received the MMS notification message 310, MMS user agent B is aware that a multimedia message is available for retrieval and may initiate a process to download the message. This may be done substantially as soon as the notification message is received, or may be performed at some later time. When MMS user agent B desires to start downloading the MMS message, it sends an MMS retrieve request 330 (MM1_retrieve.REQ) to MMSC B 224. MMSC B 224 responds by retrieving the multimedia message from MMS server B and sends an MMS retrieve response 340 (MM1_retrieve.RES in 3GPP TS 23.140) to MMS user agent B. In the case of a multimedia message that comprises only non-streamable components, as considered in this example, the MMS retrieve response message carries the actual multimedia message components to be downloaded. After receipt of the entire multimedia message, the MMS user agent B sends an MMS acknowledgement 350 (acknowledging the receipt of the entire multimedia message) to the MMS relay B.

As mentioned earlier, some media components may be suitable for downloading by streaming. The term "streaming" is generally used to describe the presentation of media content, for example an audio or video clip, or a combination of different media types, in a continuous way while the content is being transmitted to a recipient over a data network. A "stream" can be a flow of data enabling the recipient to present some continuous flow of information such as motion pictures (i.e. video), voice or music. In a typical video stream, some 10 to 20 video frames are transmitted per second. In practice, streaming can be either live (real-time) or performed in an on-demand fashion. The term "live streaming" describes the creation of a media stream from a live source, for example a stream of digital images produced by a video camera, while the term "on-demand streaming" describes the creation of a media stream from, for example, a file stored on a server.

The application of streaming in mobile networks looks very promising, especially considering the fact that mobile terminals typically have limited multimedia playing resources such as memory and processing power. In general, the adoption of a streaming approach to media download and presentation has the potential to reduce the amount of available memory required by mobile terminals Recently, interest has also arisen in the incorporation of streaming into the proposed $3^{rd}$ generation multimedia messaging service. However, as mentioned earlier, the MMS service is based on the encapsulation of media content, message description and addressing information into a single message. This kind of encapsulation is incompatible with the streaming of media content and therefore certain modifications to the MMS service recommendations are necessary in order to accommodate the streaming download of media content. 3GPP TS 23.140, release 4 allows a streaming session to be established between a recipient user agent and a recipient MMS relay, but requires that the notification message sent from the recipient MMS relay to the recipient MMS user agent be modified to a certain extent.

According to the recommendation, if a recipient MMS relay, such as MMS relay B described in the above example, receives a multimedia message containing streamable media content, it forms a modified MMS notification message and sends it to the intended recipient user agent to notify it about the streamable multimedia components. The modified notification message contains information necessary to initialise a streaming session between the recipient MMS user agent and an MMS server that has access to the streamable multimedia components.

Thus, according to 3GPP TS 23.140, release 4, the standard MMS notification message, used to inform an intended recipient user agent that a multimedia message is available for download, must be modified in such a way as to provide particulars of a streamable multimedia component to be downloaded. This enables the recipient user agent to establish a streaming session to download the multimedia component.

However, despite this modification, there is still no mechanism available in the MMS specification to enable the downloading of both streamable and non-streamable multimedia components in a consistent manner. There is need for such a capability, because it would be useful to be able to receive both non-streamable multimedia components, such as still pictures and text or program applets together with streamable multimedia components such as sound, voice or video streams.

According to a first aspect of the invention there is provided a method for receiving a multimedia message, comprising the steps of:
  receiving a multimedia message transmission;
  separating from the multimedia message transmission a descriptor containing information necessary to initiate a streaming session; and
  initiating a streaming session, using the descriptor, to retrieve a stored streamable media component described by the descriptor.

Preferably, the method further comprises the step of separating a non-streamable media component from the multimedia message transmission.

According to a second aspect of the invention there is provided a method for multimedia messaging, comprising the steps of:
  storing a multimedia message containing a streamable media component in a communications network entity;
  sending a multimedia message transmission from the network entity to a recipient user agent; and
  including in said multimedia message transmission a descriptor providing information allowing the recipient user agent to initiate a streaming session to retrieve the streamable media component.

The invention provides the advantage of allowing transmission of streamable media components using communication systems according the existing MMS specifications with only minor modifications.

Preferably, with the same multimedia message, both streamable and non-streamable components may be sent from an originator to a recipient by using the descriptor before downloading the multimedia message.

Preferably, the method further comprises notifying a recipient user agent that a message is available using a notification message. Preferably the notification message conforms to MMS specifications.

Furthermore, the invention allows the use of a single type of notification message to inform a recipient MMS user agent that a multimedia message is available for download. In other words, a single notification message type may be used regardless of the media content of a particular multimedia message. This has the advantage of simplifying the formation of notification messages and allowing the availability of multimedia messages for download to be indicated in a consistent manner.

Preferably, a streamable media component of a multimedia message comprising both a non-streamable and a streamable media component is replaced with the aforementioned descriptor, such that the multimedia message is modified to contain the non-streamable components and the descriptor. Thus, when the modified message, containing the non-streamable component and the descriptor is downloaded to the recipient user agent, the user agent can use the information provided by the descriptor to initiate a streaming session to download the streamable media component.

In a situation where a multimedia message contains more than one streamable media component, each streamable media component is advantageously replaced with a corresponding descriptor. Alternatively, the descriptor contains information relating to at least two or all streamable media components. The descriptor is then provided in the multimedia message in place of all the streamable media components, which it describes.

Preferably, this replacement is performed either by a recipient MMS relay or MMS server. In other words, the replacement is preferably performed by the MMS relay or MMS server associated with the recipient user agent. Alternatively, another communication block such as a proxy server can perform the replacement.

Preferably, the descriptor is selected from a group consisting of: a session description file, a Uniform Resource Locator (URL), and a Universal Resource Identifier (URI).

Preferably, the session description file is a session description protocol (SDP) file.

Preferably, the session description file contains all the data necessary to initiate a streaming session to download a streamable media component.

The inclusion of the descriptor in the multimedia message transmission makes it unnecessary to separately transmit the data to initiate the streaming session. This spares communication bandwidth and accelerates the messaging, as excessive messaging can be avoided. Furthermore, should the recipient user agent reject the message, no descriptor needs to be sent in vain.

According to a third aspect of the invention there is provided a multimedia messaging user agent comprising:
a transceiver for receiving a multimedia message and for establishing a streaming session; characterised by the user agent further comprising:
a processor for searching the multimedia message for a descriptor containing streaming initialisation data; and
the processor being arranged to control the transceiver to initiate a streaming session using the streaming initialisation data contained by the descriptor.

According to a fourth aspect of the invention there is provided a multimedia messaging service system comprising:
a first network entity for storing a multimedia message;
a plurality of user agents;
a second network entity for notifying a user agent of a message available to the user agent, said user agent being a recipient user agent;
a third network entity for searching the multimedia message for a streamable media component, for storing such a component of the multimedia message, and for modifying the multimedia message by placing a descriptor in the multimedia message, sufficient to allow the recipient multimedia user agent to initiate a streaming session to retrieve the streamable media component;
the second network entity being arranged to receive a request for delivering the multimedia message to the recipient user agent and to transfer the multimedia message to the recipient user agent in response to said request.

The second and third network entities may be the same, for example a multimedia relay. Alternatively, they may be different entities.

According to a fifth aspect of the invention there is provided a multimedia message comprising an address of the recipient of the multimedia message; characterised in that the multimedia message further comprises:
a descriptor containing information necessary for allowing a recipient user agent, using the descriptor, to initiate a streaming session to retrieve at least one streamable media component.

According to a sixth aspect of the invention there is provided a computer program product for controlling a multimedia messaging user agent, comprising:
computer executable program code to enable the user agent to receive a multimedia message;
characterised by the computer program product further comprising:
computer executable program code to enable the user agent to search the multimedia message for a descriptor containing streaming initialisation data; and
computer executable program code to enable the user agent to initiate a streaming session using the streaming initialisation data contained by the descriptor.

The invention will now be described, by way of example only, with reference to the accompanying drawings, in which.

Figure 1:
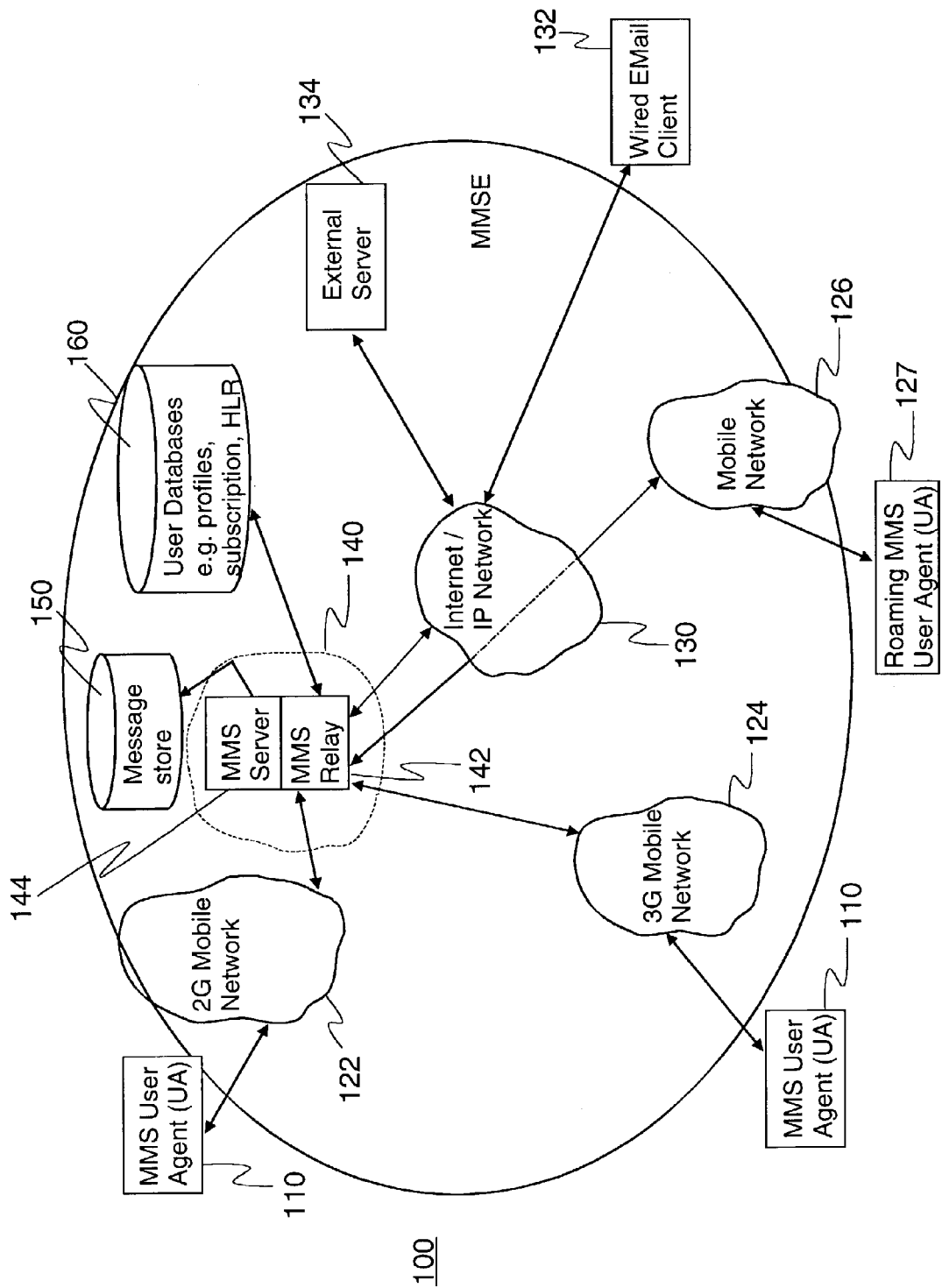
FIG. 1 shows an overview of MMS system elements according to 3GPP TS 23.140, v. 4.
Figure 2:
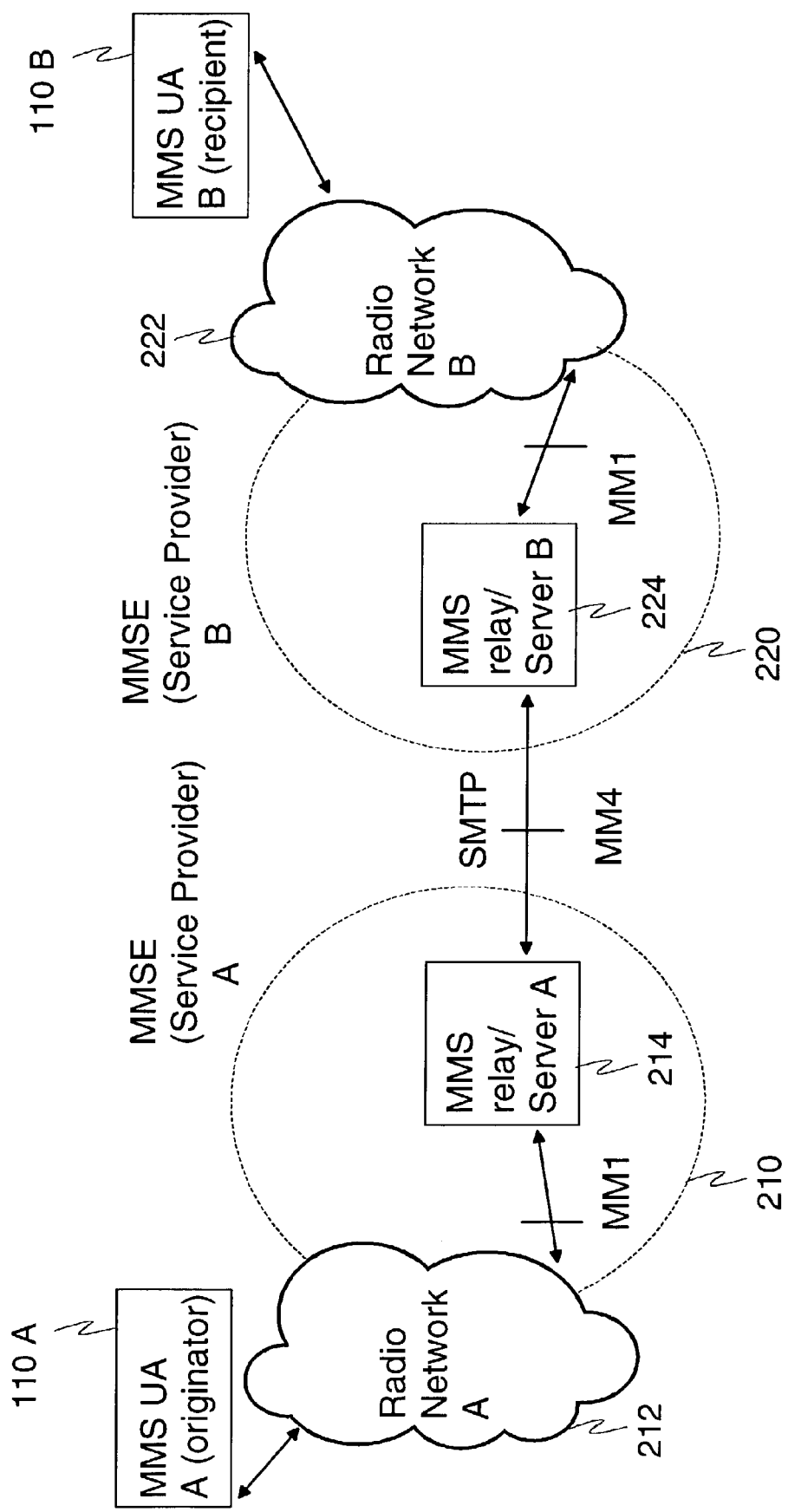
FIG. 2 shows an overview of interworking MMS system elements according to 3GPP TS 23.140, v. 4.
Figure 3:
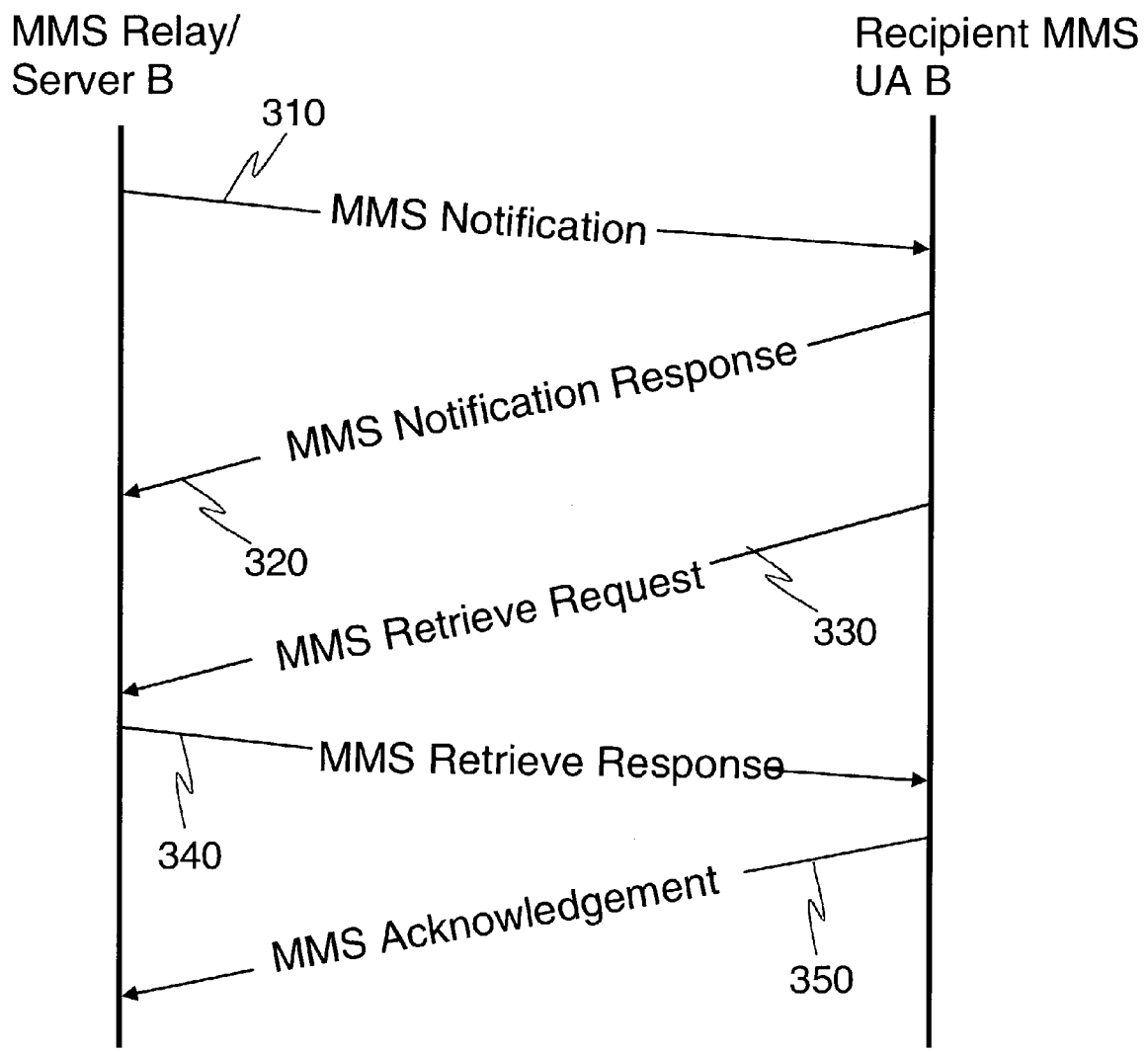
FIG. 3 shows the flow of messages between a receiving MMS relay/MMS server and a recipient MMS user agent.

FIGS. 1 to 3 have been described in the foregoing to illustrate the prior art. They also form a framework within which the present invention can be implemented.

A preferred embodiment of the invention will next be described with reference to the operation of an MMS system on receiving a multimedia message containing streamable- and non-streamable components. An example implementation of an MMS system that supports the preferred embodiment will also be described.

The preferred embodiment of the present invention is based on replacing a streamable multimedia component of a multimedia message with a descriptor that provides information allowing a recipient MMS user agent 110B to initiate a streaming session to download the streamable component. As previously described, until now streaming in connection with MMS has only been possible by altering the MMS notification message 310. In the preferred embodiment of the present invention, the descriptor is embedded in the multimedia message and is received by a recipient user agent just as any other multimedia component in the MMS retrieve response. The user agent extracts the information provided by the descriptor, which can then be used to initiate a streaming session to download the streamable component. This means that it is no longer necessary to modify the MMS notification message 310.

Figure 4:
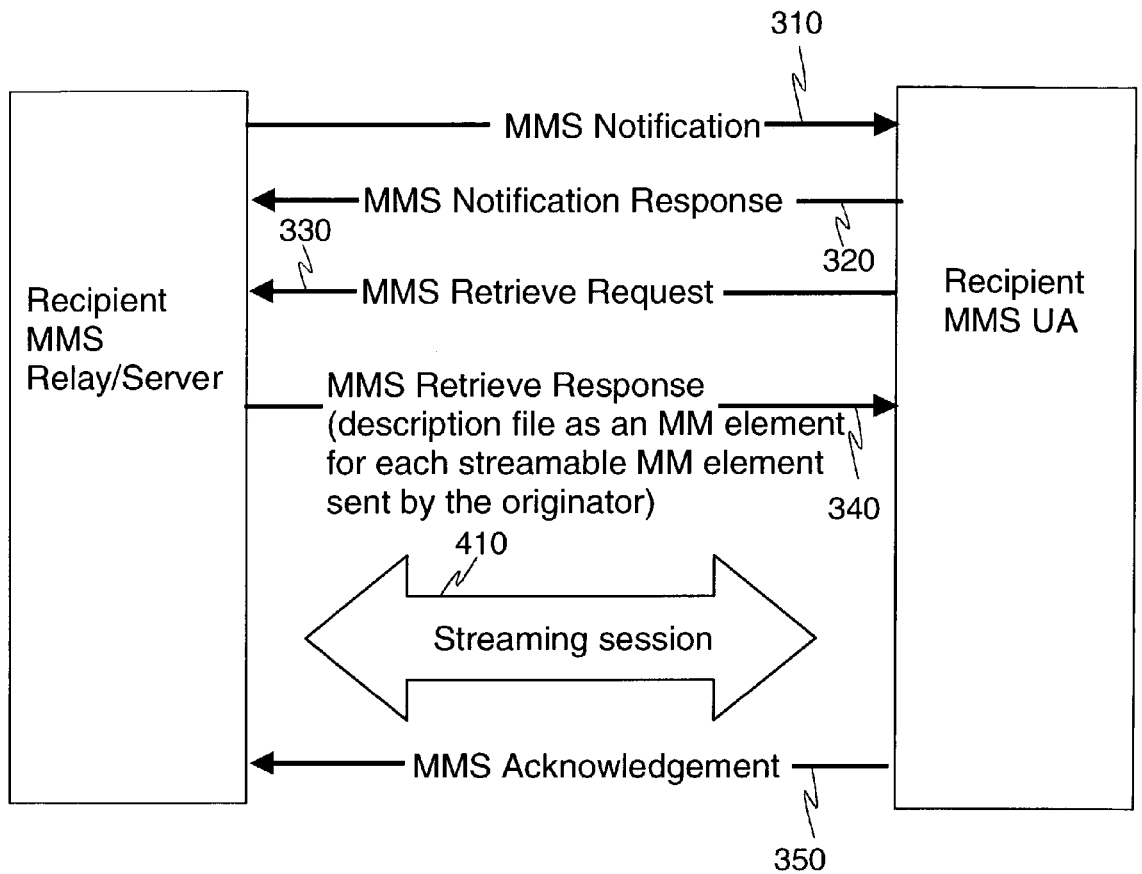
FIG. 4 shows the flow of messages between a receiving MMS relay/MMS server and a recipient MMS user agent, according to a preferred embodiment of the present invention.

FIG. 4 shows the flow of messages that takes place between a recipient MMSC and a recipient MMS user agent, according to the preferred embodiment of the present invention. After arrival of a multimedia message at the MMSC, messages 310 to 330 are first exchanged. This happens in a manner equivalent to what takes place in a conventional MMS system when there are no streamable components in a received multimedia message. The modifications introduced by the present invention affect the signalling that takes place after the MMS retrieve request 330. According to the preferred embodiment, if the received multimedia message comprises a streamable media component in addition to a non-streamable media component, the MMS retrieve response 340 contains the non-streamable multimedia message component and a descriptor describing the streamable multimedia component. According to the preferred embodiment, in a situation where the multimedia message contains more than one streamable media component, each streamable media component is replaced with a separate descriptor, each descriptor comprising information sufficient to allow the recipient user agent 110B to initiate a streaming session for receiving the streamable media component in question.

If the multimedia message contains only streamable components, then the multimedia message will only contain descriptors of streamable components.

Typically, the descriptors are arranged in form of a session description file, such as a Session Description Protocol (SDP) document, which is included within the MMS message. The actual file structure can be implemented in various manners, but according to the preferred embodiment, a structure such as that shown in Wireless Application Protocol WAP Multimedia Messaging Service Version 1.0, Message Encapsulation Draft 0.8 (17-Feb.-2000), FIG. 2 is used. It is advantageous to arrange the multimedia message such that the descriptor is delivered in the early part of the MMS message so that the streaming session(s) can be initiated without large delays, after downloading of the MMS message has commenced.

In an alternative embodiment, a shared session description file contains descriptions of two or more downloadable multimedia components.

The session description file provides a description of the presentation for a particular streamable multimedia component and allows the recipient to accomplish the media intialisation part of the streaming process. An SDP file is a good example of a widely used session description file type. SDP has an Internet Assigned Numbers Authority (IANA) registered Multi-purpose Internet Mail Extensions (MIME) type to be mentioned as the content type of the component of the MMS Retrieval Response message 340.

Advantageously, the session description file contains the following data: a protocol version, information about the owner and/or creator of the media content, a session identifier, a session name and attributes, session information, an originator identifier, such as the e-mail address or phone number of the sender of the message, connection information, bandwidth information, different time-related information, and a title and attribute for each media component described by the session description file. The session description file may further comprise some cryptographic information, such as a Message Authentication Code (MAC), a cryptographic checksum for checking the validity of the content, or a challenge for allowing the recipient MMS user agent to generate a session key to be used for decrypting or validating the content.

In alternative embodiments, other forms of files are used for this purpose. TEXT, RTSL and MHEG are some other example files to be used for this purpose and all these files have a registered MIME type.

The streaming session is implemented according to commonly used streaming protocols. The Real Time Streaming Protocol (RTSP) is a well-known session layer protocol in this regard. The Real Time Protocol/Real Time Control Protocol (RTP/RTCP) are designed to control the transport of streaming content, while the user datagram protocol (UDP) and/or transmission control protocol (TCP) can be used as transport protocol for streaming.

The use of separate session description files provides the advantage of more flexible use, since different network entities may replace different streamable multimedia components with respective descriptors.

The multimedia message, that is, the content, can be up loaded to the MMSC either by streaming or by any other appropriate method. In the preferred embodiment of the present invention, use of streaming in downloading media content to a given recipient is independent of the manner in which the content was uploaded to the MMS relay B.

Figure 5:
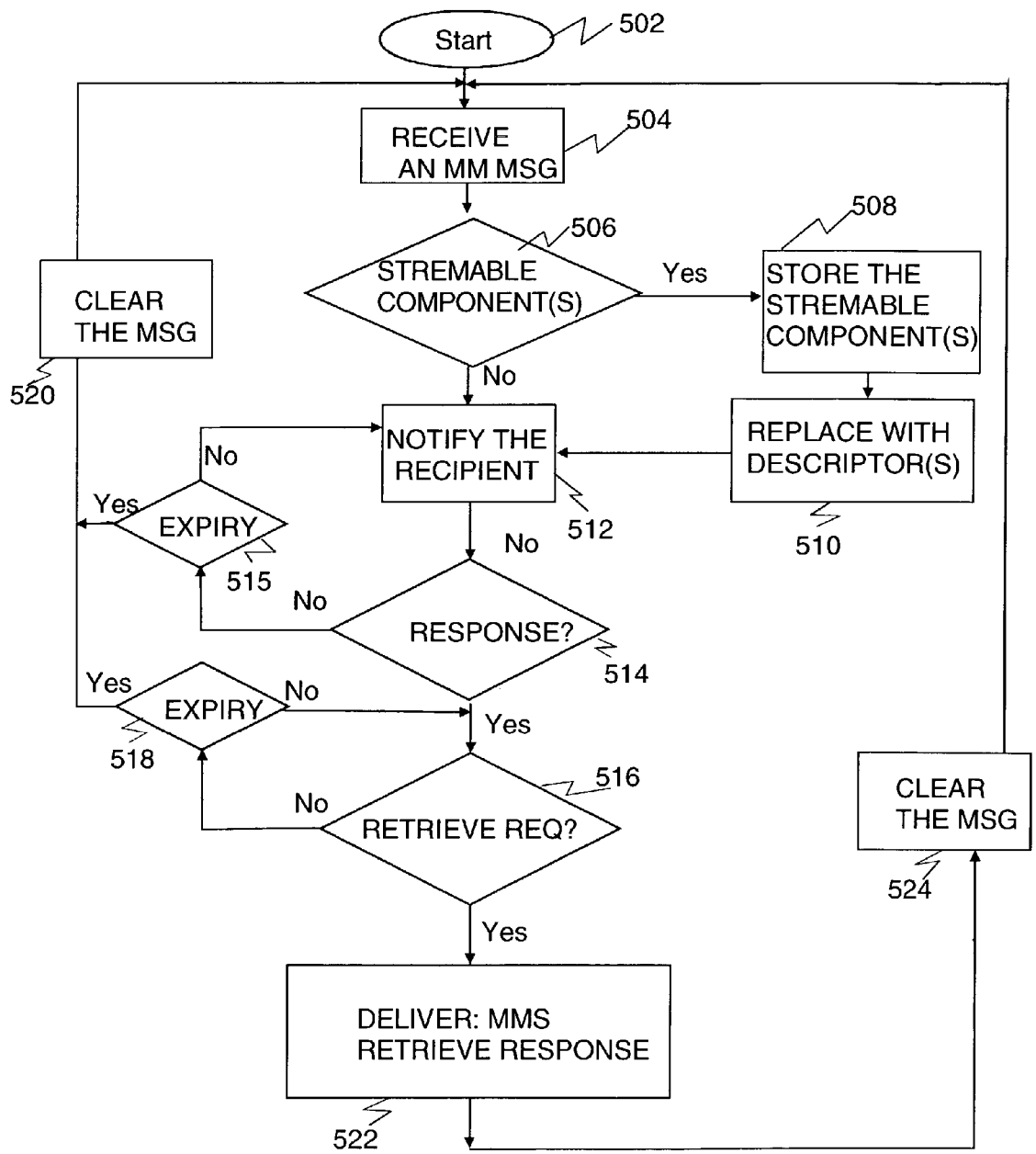
FIG. 5 shows a flow chart describing the operation of an MMS relay, according to a preferred embodiment of the present invention.

FIG. 5 shows a flow chart describing the operation of a recipient MMS relay according to the preferred embodiment of the present invention. The operation starts from block 502. Next, the MMS relay B receives a multimedia message (block 504). The MMS relay checks whether the multimedia message contains any streamable media components (block 506). If it does, each streamable media component is stored (block 508) and a descriptor appropriate for the component in question is formed and included in the multimedia message in place of the media component itself (block 510). In the next step of the operation, the recipient MMS user agent is notified (MMS notification) that the multimedia message is available (block 512).

After receiving notification of an available multimedia message, the recipient MMS user agent should acknowledge the notification by sending an MMS notification response message. The MMS relay checks if it has received the MMS notification response (block 514). If not, the MMS relay checks whether the message has expired (block 515). If the message has not expired, the relay attempts to notify the recipient again, for example, after a predetermined time period has elapsed. If the message has expired, the MMS relay will not attempt to notify the recipient user agent again and advantageously clears the message (block 520), that is, erases the stored media components related thereto.

If a notification response is received (block 514), the operation proceeds by checking for the receipt of an MMS retrieve request (block 516). In the preferred embodiment of the invention, the MMS retrieve request can be integrated with the notification response, if both of these would otherwise be transmitted within a short period of time (for example, 1, 5 or 10 minutes), or if automatic downloading of incoming multimedia messages has been selected.

If the retrieve request has not been received, the MMS relay checks whether the multimedia message has expired (block 518). If it has, the operation proceeds to block 520 and the multimedia message is cleared as explained above. If the multimedia message has not expired, the operation proceeds to block 522. There the multimedia message, now containing a descriptor for each streamable multimedia component, is transmitted to the recipient MMS user agent. After transmission of the multimedia message, the message is cleared (block 524) if it is not needed for transmission to another recipient (e.g. in the case of multicasting). Typically, the message is cleared only after an acknowledgement of receipt has been received from the recipient MMS user agent.

Typically, an MMS relay is implemented as a server computer and is controlled by a computer program, which enables the MMS relay to operate according to the aforementioned steps.

Figure 6:
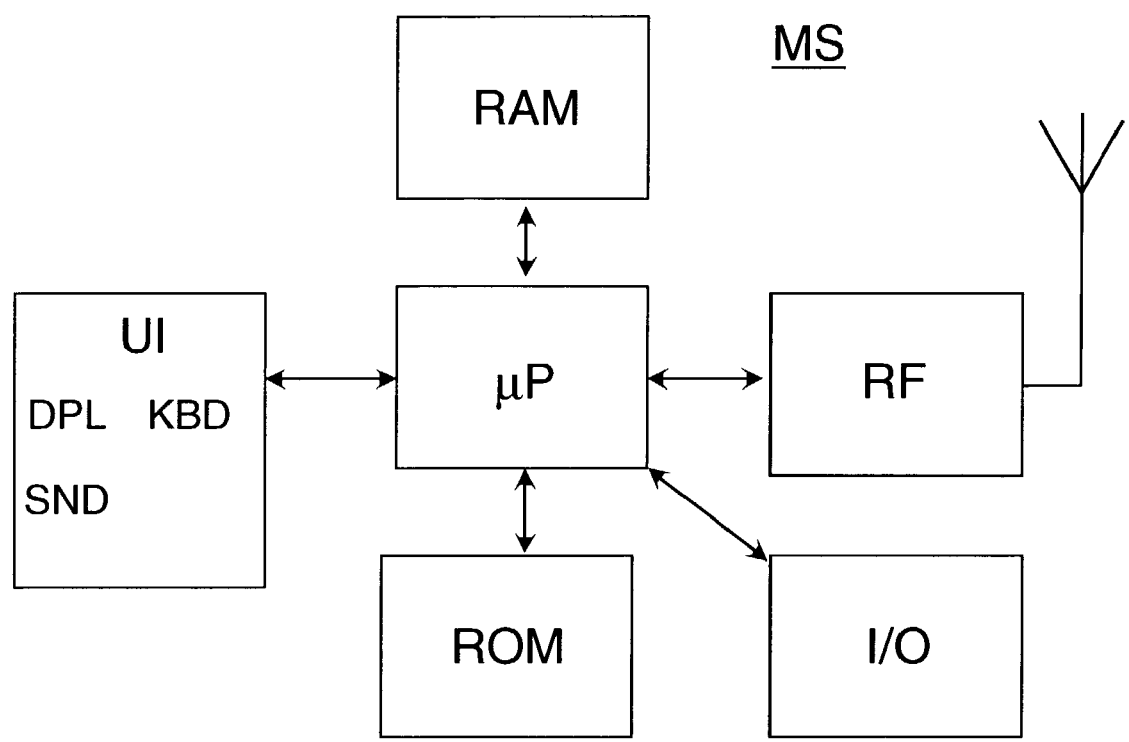
FIG. 6 shows a block diagram of the structure of an MMS user agent, according to the preferred embodiment of the present invention.

FIG. 6 shows the structure of an MMS user agent according to the preferred embodiment of the present invention in which the MMS user agent is implemented in a wireless communication device. A microprocessor μP controls the blocks responsible for the MMS user agent's different functional blocks. These functional blocks comprise a random access memory RAM, a radio frequency block RF, a read only memory ROM, an input/output port I/O for external connections, a user interface UI, having an audio system SND and a display DPL for presenting multimedia messages and a keyboard KBD for receiving data and commands from a user. The microprocessor's operating instructions, that is program code and the MMS user agent's basic functions are stored in advance, for example during the manufacturing process, in the ROM. In accordance with its program, the microprocessor uses the RF block for transmitting and receiving messages on a radio path. The microprocessor monitors the state of the user interface UI and controls the MMS user agent according to the program code. On receiving a multimedia message, the microprocessor μP examines the message for a descriptor of a streamable multimedia component. If it finds a descriptor, it initiates a streaming session accordingly for retrieving, or down streaming, a corresponding multimedia component. If more than one descriptor is found, a corresponding number of streaming sessions are initiated for down streaming the respective multimedia components.

Typically, the streaming sessions are set up substantially immediately, but alternatively, the descriptor information can also be stored in the random access memory RAM and used at some later time to initiate a streaming session.

If a particular multimedia component is of a type not supported by the MMS user agent itself, the microprocessor may control the input/output port I/O to forward such a component to an external device that supports that type of multimedia component. Such an external device may be a personal computer, typically a laptop computer. This also provides the advantage of allowing use of enhanced user interface and sound capabilities, if the external device provides such facilities. The input/output port may be an infrared port, a wired port, or a Low Power Radio Frequency connection port such as a Bluetooth port.

In case of a streamable multimedia component, the descriptor information can be passed to such an external device to enable that external device to establish a streaming session, either via the MMS user agent or via another route, such as fixed Internet access.

Advantageously, the MMS relay has access to a user profile of the recipient user agent stored in the user databases 160. Using the profile, it can determine whether each of the multimedia components of a multimedia message conforms to the capabilities of the recipient user agent and/or preferences defined the recipient user agent's user profile. If necessary, the multimedia components of excessive quality may be down-converted to a lower, but sufficient quality level, such that their transmission is faster and they can be readily used by the recipient user agent without any further conversion or manipulation before presentation to the user. Similarly, multimedia components may be converted from one media format to another, such that the result conforms to the capabilities and/or preferences of the recipient user agent. The conversion may be made either beforehand or on/during transmission of the MMS retrieve response.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached patent claims.

The invention claimed is:

1. A method, comprising:
receiving a notification message at a recipient device, said notification message indicating availability of a multimedia message at a communication network entity, said multimedia message comprising a non-streamable and a streamable component;
sending to the communication network entity a retrieve request to receive the multimedia message;
receiving, responsive to the retrieve request, the multimedia message from the communication network entity at the receiving device, the received multimedia message comprising the non-streamable component and a descriptor associated with the streamable component, the streamable component having been replaced with the descriptor; and
initiating a streaming session, using the descriptor, to retrieve the streamable component of the multimedia message.

2. The method according to claim 1 wherein:
the multimedia message comprises more than one streamable component, and wherein the method further comprises:
replacing at least two streamable components with one descriptor common for all replaced components.

3. The method according to claim 1, wherein:
the descriptor is selected from a group consisting of a session description file, a uniform resource locator, and a Universal Resource Identifier.

4. The method according to claim 1, wherein:
the session descriptor is a session description protocol file.

5. The method according to claim 1, wherein:
the descriptor contains all the data necessary to initiate a streaming session to download the streamable component.

6. The method according to claim 1, wherein the recipient device comprises a wireless device.

7. The method according to claim 1 wherein:
the multimedia message comprises more than one streamable component, and wherein the method further comprises:
replacing each streamable component with a corresponding descriptor.

8. A method, comprising:
receiving a multimedia message at a communication network entity, said multimedia message comprising a streamable component and a non-streamable component;
replacing the streamable component with a descriptor associated with the streamable component;
sending a notification message to a recipient device, said notification message indicating availability of the multimedia message;
receiving from the recipient device a retrieve request to receive the multimedia message;
sending, responsive to the retrieve request, the multimedia message to the recipient device, the multimedia message sent to the recipient device comprising the non-streamable component and the descriptor associated with the streamable component of the multimedia message.

9. The method according to claim 8 wherein:
the multimedia message comprises more than one streamable component, and wherein the method further comprises:
replacing at least two streamable components with one descriptor common for all replaced components.

10. The method according to claim 9, wherein:
replacement is performed by an entity selected from a group consisting of a recipient multimedia messaging service relay, a recipient multimedia messaging service server, and an intermediate communication block.

11. The method according to claim 8, wherein the recipient device comprises a wireless user agent.

12. The method according to claim 8, wherein:
the descriptor is selected from a group consisting of a session description file, a uniform resource locator, and a Universal Resource Identifier.

13. The method according to claim 8, wherein:
the session description file is a session description protocol file.

14. The method according to claim 8, further comprising:
receiving a request for a streaming session from the recipient device, the requested streaming session corresponding to the descriptor;
initiating the requested streaming session with the recipient device; and
sending the streamable component to the recipient device using the streaming session.

15. A multimedia messaging user agent comprising:
a transceiver for receiving a notification message and a multimedia message and for establishing a streaming session, the notification message indicating availability of the multimedia message, the multimedia message comprising a streamable component and a descriptor associated with a streamable component of the multimedia message, the streamable component having been replaced with the descriptor; and
a processor for extracting streaming initialization data from the descriptor,
the processor controlling the transceiver to initiate a streaming session using the streaming initialisation data contained by the descriptor.

16. A computer program product, embodied on a non-transitory computer-readable medium, for controlling a multimedia messaging user agent, comprising:
computer executable program code enabling the multimedia user agent to receive a notification message and a multimedia message and for establishing a streaming session, the notification message indicating availability of the multimedia message, the multimedia message comprising a streamable component and a descriptor associated with a streamable component of the multimedia message, the streamable component having been replaced with the descriptor;
computer executable program code enabling the multimedia user agent to extract streaming initialisation data from the descriptor; and
computer executable program code enabling the multimedia user agent to initiate a streaming session using the streaming initialization data contained by the descriptor.

17. A network entity comprising:
an input for receiving a multimedia message comprising a non-streamable and a streamable component;
a memory for storing the multimedia message;
an output for sending a notification message and a multimedia message to a recipient user agent; and
a processor for modifying the multimedia message by replacing the streamable component of the multimedia message with a descriptor associated with the streamable component, the descriptor providing sufficient information for allowing the recipient user agent to initiate a streaming session to retrieve the streamable component of the multimedia message, and for controlling the output to send the modified multimedia message to the recipient user agent.

18. The network entity according to claim 17, wherein the multimedia message comprises more than one streamable components, and wherein the processor is further configured to replace at least two streamable components with one descriptor common for all replaced components.

19. The network entity according to claim 17, selected from a group consisting of a recipient multimedia messaging service relay, a recipient multimedia messaging service server, and an intermediate communication block.

20. The network entity according to claim 17, wherein:
the descriptor is selected from a group consisting of a session description file, a uniform resource locator, and a Universal Resource Identifier.

21. The network entity according to claim 17, wherein the descriptor is a session description protocol file.

22. The network entity according to claim 17, wherein the descriptor contains all the data necessary to initiate a streaming session to download the streamable component.

23. The network entity according to claim 17, wherein the recipient user agent comprises a wireless user agent.

24. A computer program product, embodied on a non-transitory computer-readable medium, for controlling a network entity, comprising:
computer executable program code enabling the network entity to receive a multimedia message comprising a streamable component and a non-streamable media component;
computer executable program code enabling the network entity to store the multimedia message; and
computer executable program code enabling the network entity to modify the multimedia message by replacing the streamable component of the multimedia message with a descriptor associated with the streamable component, the descriptor providing sufficient information for allowing the recipient user agent to initiate a streaming session to retrieve the streamable component of the multimedia message;
computer executable program code enabling the network entity to send the modified multimedia message to the recipient user agent.

25. The computer program product according to claim 24, wherein the multimedia message further comprises more than one streamable component, the computer program product further comprising:
   computer executable program code enabling the network entity to replace each streamable component with a corresponding descriptor.

26. The computer program product according to claim 24, wherein the recipient user agent comprises a wireless user agent.

27. The computer program product according to claim 24, wherein the multimedia message further comprises more than one streamable component, the computer program product further comprising:
   computer executable program code enabling the network entity to replace at least two streamable components with one descriptor common for all replaced components.

* * * * *